June 2, 1959 L. PÉRAS 2,889,183
PACKING RING
Filed Dec. 7, 1955 3 Sheets-Sheet 1
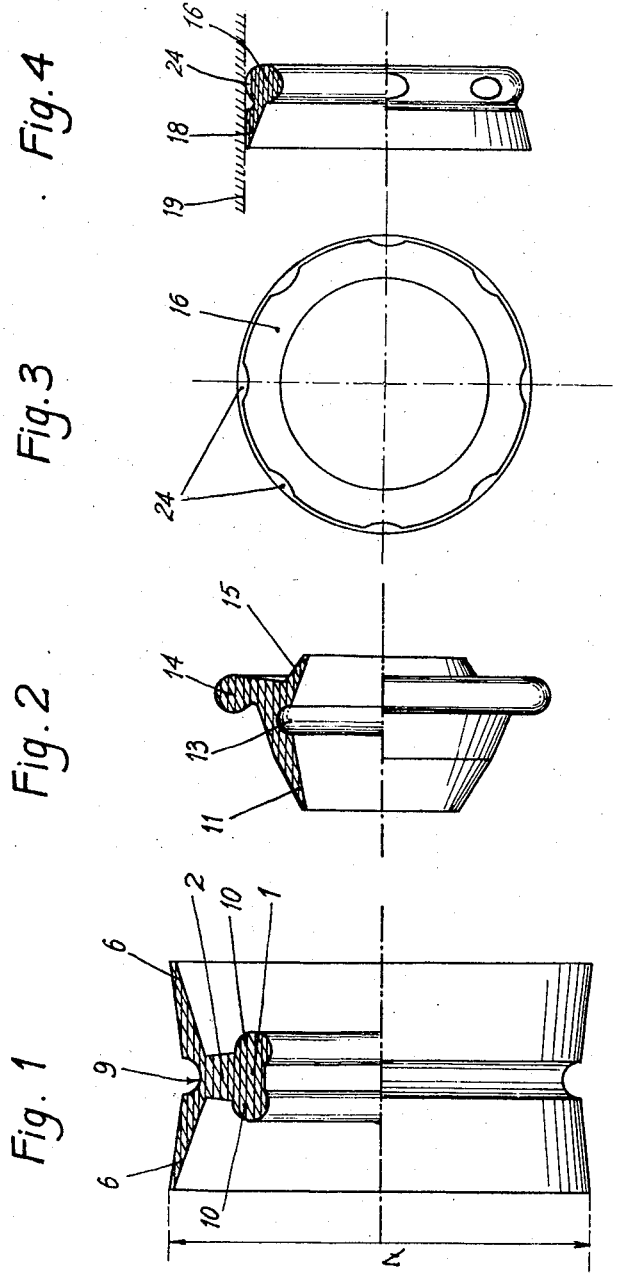

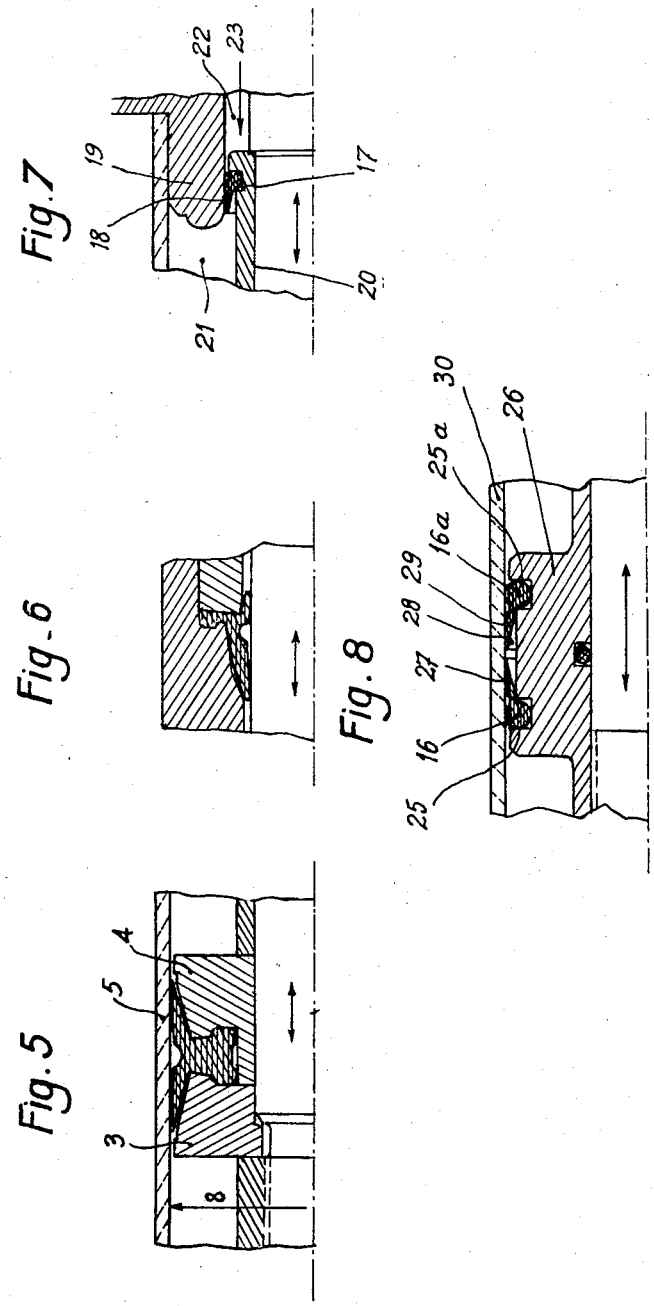

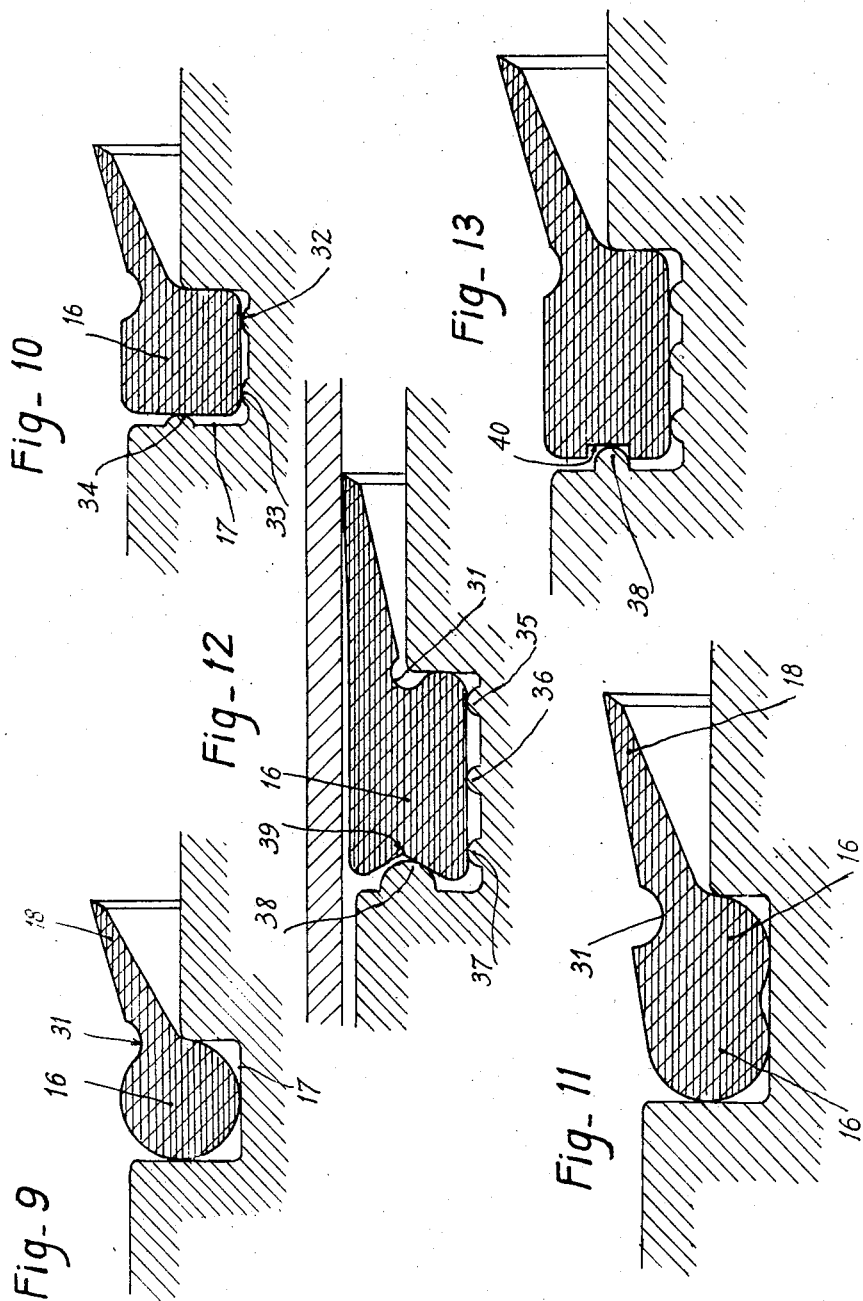

United States Patent Office 2,889,183
Patented June 2, 1959

2,889,183

PACKING RING

Lucien Péras, Billancourt, France, assignor to Regie Nationale des Usines Renault, Billancourt, France Application December 7, 1955, Serial No. 551,627

16 Claims. (Cl. 309—33)

The invention relates to the packing rings intended to effect a seal in applications comprising the sliding of a rod or a piston in a cylinder containing fluid under pressure, particularly in pumps, jacks, lifting tackle etc.

A method of fixing a packing ring in a stuffing box is already known, ensuring sealing between a cylinder and a sliding rod or of a piston sliding in its cylinder. This known method of fixing immobilizes the packing ring perfectly without causing straightening of its rims, but the tightening of the collar for fixing the packing ring causes a certain swelling of the central portion thereof, which central portion is thus applied tightly against the wall of the cylinder or the surface of the rod. In the case of the cylinder, this does not cause any inconvenience if the cylinder is correctly machined and trued; on the other hand in a cylinder consisting of a tube of standard quality which may be slightly out of round, this swelling of the packing ring causes the appearance of hard points on its path which hamper the free movement of the piston in the cylinder and may even jam it.

The invention relates to a packing ring which completely eliminates the risk explained above, in such a manner that it can be used equally well with tubes and rods of standard manufacture or with carefully machined tubes and rods. According to the invention, the section of the packing ring comprises a narrow central portion connecting one or more rims which effect the sealing of the sliding members, to one or more beads fitted in a suitable seating provided in the member which carries the packing ring. At the same time, the diameters at the ends of the rims of the packing ring are slightly greater than the dimensions which the ring will occupy in operation, so that strains are set up in the packing ring after it has been placed in position, which have the effect of keeping it applied against the wall with which it cooperates, and a circular portion of reduced thickness provided at the junction point between the rims and the central portion acts as an articulation conferring great flexibility on the rims. Finally the central portion of reduced thickness widens out in the direction of the bead or beads, in the form of a trapezium, for example, so that the beads are locked in their seating and are capable of effecting sealing between the assembled members of the device carrying the packing ring, in the same manner as toroidan piston rings.

Since the packing ring is immobilised by the widened section of its central portion it cannot leave its housing although no excessive lateral effort is exerted on the packing ring. The rims thereof are constantly applied without excessive pressure or swelling.

Several embodiments of the packing ring according to the invention will now be described by way of non-limiting example, with reference to the accompanying drawings in which:

Figure 1 is a side view, partly in section, of a piston ring;

Figure 2 is a side view, partly in section of a stuffing-box packing for a piston rod;

Figure 3 is a view in elevation of a special piston ring which can act as a valve;

Figure 4 is a side view, partly in section of the piston ring of Figure 3;

Figure 5 shows the piston ring of Figure 1 mounted on a piston;

Figure 6 shows the packing ring of Figure 2 mounted in a stuffing-box;

Figure 7 shows the piston ring in Figures 3 and 4 mounted on a piston;

Figure 8 shows a different application of the piston ring in Figures 3 and 4;

Figures 9 to 13 show various modifications of the packing ring according to the invention.

Referring to Figures 1 and 5, 1 is the annular body of the packing ring, made of moulded material, having a central trapezoidal portion 2 held between the discs 3 and 4 forming a piston, the tightening of the discs being such that it cannot cause the swelling of the piston ring against the cylinder 5.

6 are the rims of the packing ring which ensure the sealing of the piston 3—4 in the clylinder 5. It will be seen that the diameter 7 of the rims is slightly greater than the internal diameter 8 of the cylinder, in order to produce a constant application of the rims against the wall of the cylinder. 9 is a circular recess reducing the thickness of the connection between the central portion 2 and the rims, and giving the latter a great flexibility of movement. 10 are beads effecting sealing in the seating on the piston in the manner of two toroidal piston rings.

In Figures 2 and 6 there will be found the features which confer on this embodiment the same properties as those of the piston ring. 11 is the sealing rim and 13 the recess which ensures its mobility. The bead 14 forms an effective static seal at the same time locating the packing in the stuffing box. 15 is a scraper rim preventing the entry of foreign bodies, such as dust and grains of sand, into the stuffing-box.

The packing ring in Figures 3, 4 and 7 can act as a valve.

The piston-ring bead 16, fitted in the manner of a toroidal piston ring in a seating 17 on a piston 20 carries the rim 18 which rests against the cylinder 19 as soon as the piston 20 enters it.

From this moment, the rim 18 and the body 16 of the packing ring prevent the passage of fluid, such as air, from the chamber 21 to the chamber 22. On the other hand, when the fluid pressure is higher in 22 than in 21, the packing ring 16 permits the passage of fluid towards the chamber 21. This access is possible as a result of grooves 24 (Figures 3 and 4) provided on the periphery of the bead 16 and on the rim 18, which yields under the influence of pressure exerted in the direction of the arrow 23.

According to another application of the packing ring, two piston rings of this type may replace the packing ring in Figures 1 and 5. Two packing rings 16 and 16a (Figure 8) are then placed in opposite directions to one another in circular grooves 25 and 25a provided in a piston 26. When the pressure on the latter is exerted from left to right, the rim 27 yields and permits the passage of the fluid to the space 28 between the two packing rings, and this has the effect of applying the rim 29 firmly against the cylinder 30. Sealing between the piston 26 and the cylinder 30 is thus effected. When the pressure of the fluid is exerted from right to left, the action of the packing rings 25 and 25a is obviously reversed. This application has the advantage of using a piston in a single piece which simplifies the operations involved in replacing the piston rings.

Referring to Figure 9, the piston ring illustrated has a shape derived from the piston ring indicated in Figures 11 and 12. In certain applications a large air passage does not have to be provided above the rim 18 and it is not necessary to provide notches in the bead 16 of the piston ring. It is sufficient for the bead 16 to have an external diameter, after mounting, which is less than the bore of the cylinder. The guiding of the piston is again effected by the bead, but the clearance is sufficient to allow the passage of the air which has to get above the rim. This arrangement is also of value when the cylinder is long and its bore is not of uniform dimensions. It should be noted that the piston ring is mounted under tension in the bottom of the groove 17 in the piston. The groove 31, which renders the rim 1 more flexible, may be provided underneath the latter, as shown above where it is provided thus by way of example. The same applies to all the modifications of the piston ring.

Figure 10 shows a modification in which the bead 16 is square in section. The piston-ring groove 17 comprises beads 32, 33, 34 which are semi-toroidan in shape and which effect contact with the piston ring along one generating line. There is no bead on the face on the rim side because in all cases the pressures acting on the piston ring tend to apply the latter against the beads 32, 33, 34.

The cylinder has a diameter slightly greater than the outside of the bead 16 shown. The piston ring is likewise mounted under tension against the base 17 of the groove.

Figure 11 shows a modification of the piston ring of Figure 1 applicable to large diameters of piston. In this case it would be necessary to make the diameter of the bead 16 (Figure 9) very large. A double bead 16, 16 is therefore made so that there is less difficulty in placing the piston ring in position.

Figure 12 shows a modification for large diameter piston rings, consequently having a large bead section; the latter has a rectangular section and rests on the bottom of a groove comprising a plurality of ribs 35, 36, 37. The face of the groove of the piston opposite the sealing rim has a supporting rib 38 against which rests the inner surface of a V-shaped channel 39 in the bead 16. This channel prevents the piston ring from leaving the groove. The rim of the piston ring is reduced in thickness by means of an internal incision 31, the purpose of which has already been explained.

Figure 13 shows a modification in which the V-shaped channel in Figure 12 preventing the piston ring from escaping, is replaced by a channel 40 of rectangular section. The face of the channel 40 having the smaller radius abuts against the corresponding rib 38 on the piston.

In all the embodiments, the diameter of the cylinder is slightly greater than the outside diameter of the bead of the packing ring.

I claim:

1. In a packing structure, the combination comprising a pair of cooperating members having opposite coaxial cylindrical faces and being movable relative one another, one of said members having at least one annular packing groove open to its cylindrical face, a yieldable packing element having a body portion disposed in said groove, said groove having surfaces, the groove surfaces engaging said body portions along a plurality of points providing at least line contact, said packing element being disposed in the groove while substantially non-compressed, an annular, wide tapered rim extending outwardly from said body portion and out of the groove so as to engage the opposite face to form a seal between the cooperating members, said rim having a peripheral marginal portion thinner in section than any other portion thereof.

2. In a packing structure, the combination comprising a pair of cooperating members having opposite coaxial cylindrical faces and being movable relative one another, one of said members having at least one annular packing groove open to its cylindrical face, a yieldable packing element having a body portion disposed in said groove, said groove having surfaces, the surfaces engaging said body portions along a plurality of points providing at least line contact, said packing element being disposed in the groove while substantially noncompressed, an annular thin-sectioned tapered rim extending outwardly from said body portion and out of the groove so as to engage the opposite face to form a seal between the cooperating members, said rim having a peripheral marginal portion thinner in section than any other portion thereof, an annular depression in said packing element for increasing the yieldability of said rim and the ease of movement of said rim with respect to said body portion, said annular depression being positioned adjacent a point where said rim joins the packing element body portion.

3. In a packing structure according to claim 1, in which said packing element body portion is substantially circular in cross-section.

4. In a packing structure according to claim 1, in which said packing element body portion is substantially rectangular in cross-section.

5. In a packing structure according to claim 1, in which the diameter of the rim is greater than the inside diameter of the member whose face the rim engages to effect a seal.

6. In a packing structure according to claim 1, in which the rim has a diameter smaller than the diameter of the member whose face it engages, to selectively permit passage of a fluid.

7. In a packing structure according to claim 1, in which said packing element body portion is provided with a notch, and in which said groove has a projection engaging said notch to prevent the packing element from becoming disengaged from the groove.

8. In a packing structure the combination comprising a pair of cooperating members having opposite coaxial cylindrical faces and being movable relative one another, one of said members having an annular packing groove open to its cylindrical face, a yieldable packing element having a substantially symmetrical body portion disposed in said groove, at least one annular bead on said body portion contacting a surface of the groove to provide line contact between the body portion and the groove to permit the body portion to be supported in the groove substantially without being compressed, an annular thin-sectioned tapered rim extending outwardly from said body portion and out of the groove so as to engage the opposite face to form a seal between the cooperating members, said rim having a peripheral marginal portion thinner in section than any other portion thereof, an annular depression in said packing element for increasing the yieldability of said rim and the ease of movement of said rim with respect to said body portion, said annular depression being positioned adjacent a point where said rim joins the packing element body portion.

9. In a packing structure the combination comprising a pair of cooperating members having opposite coaxial cylindrical faces and being movable relative one another, one of said members having an annular packing groove open to its cylindrical face, a yieldable packing element having a body portion disposed in said groove, said body portion having at least one arcuate surface providing line contact between the body portion and the groove, to permit disposing said packing element in the groove while substantially noncompressed, an annular tapered rim extending upwardly from said body portion and out of the groove so as to engage the opposite face to form a seal between the cooperating members, said rim having a peripheral marginal portion thinner in section than any portion thereof, a depression in said packing element for increasing the yieldability of said rim and the ease of movement of said rim with respect to said body portion, said annular depression being positioned adjacent a point where said rim joins the packing element body portion.

10. In a packing structure the combination comprising a pair of cooperative members having opposite coaxial cylindrical faces and being movable relative one another, one of said members having an annular packing groove open to its cylindrical face, a yieldable packing element having a substantially symmetrical body portion, said body portion being trapezium-shaped, two rims extending outwardly from said body portion and out of the groove in opposite directions so as to engage the opposite face to form a seal between the cooperating members, said rims each having a peripheral marginal portion thinner in section than any other portion thereof, a depression in said packing element for increasing the yieldability of said rims and the ease of relative movement of said rims with respect to said body portion, said depression being positioned adjacent a point where said rims join the packing element body portion.

11. In a packing structure according to claim 10, including two beads on said trapezium-shaped body portion, each bead positioned on opposite sides of the axis of symmetry and providing line contacts with a surface of the groove to permit disposing said packing element in the groove while substantially noncompressed.

12. In a packing structure according to claim 11, in which said groove has two recesses open to the groove, said beads being engaged in said recesses.

13. In a packing structure the combination comprising a pair of cooperating members having opposite coaxial cylindrical faces and being movable relative one another, one of said members having an annular packing groove open to its cylindrical face, a yieldable packing element having a body portion disposed in said groove, said groove having surfaces defining at least one annular bead providing a surface having a predetermined radius in contact with said body portion to permit disposing said packing element in the groove while substantially noncompressed, an annular tapered rim extending outwardly from said body portion and out of the groove so as to engage the opposite face to form a seal between the cooperating members, said rim having a peripheral marginal portion thinner in section than any other portion thereof, an annular depression in said packing element for increasing the yieldability of said rim and the ease of relative movement of said rim with respect to said body portion, said annular depression being positioned adjacent a point where said rim joins the packing element body portion.

14. In a packing structure, the combination comprising a pair of cooperating members having opposite coaxial cylindrical faces and being movable relative one another, one of said members having an annular packing groove open to its cylindrical face, a yieldable packing element having a body portion disposed in said groove, said groove having surfaces, the surfaces engaging said body portion along a plurality of points providing line contact to permit disposing said packing elements in the groove substantially noncompressed, an annular tapered rim extending outwardly from said body portion and out of the groove so as to engage the opposite face to form a seal between the cooperating members, said rim having a plurality of radially disposed depressions to selectively permit passage of a fluid from one side to the other thereof, in one direction only, said rim having a peripheral marginal portion thinner in section than any other portion thereof, an annular depression positioned adjacent a point where said rim joins the packing element body portion, whereby the rim is yieldably joined to the packing element body portion.

15. In a packing structure, the combination comprising a pair of cooperating members having opposite coaxial cylindrical faces and being movable relative one another, one of said members having at least one annular packing groove open to its cylindrical face, a yieldable packing element having a body portion disposed in said groove, said groove having surfaces, the groove surfaces engaging said body portions along a plurality of points providing line contact, said packing element being disposed in the groove while substantially non-compressed, an annular, wide tapered rim extending outwardly from said body portion and out of the groove so as to engage the opposite face to form a seal between the cooperating members, said rim having a peripheral marginal portion thinner in section than any other portion thereof and being adapted for selectively allowing passage of a fluid in a given direction parallel to said cylindrical faces.

16. In a packing structure, the combination comprising a pair of cooperating members having opposite coaxial cylindrical faces and being movable relative one another, one of said members having at least one annular packing groove open to its cylindrical face, a yieldable packing element having a body portion disposed in said groove, said groove having surfaces, the surfaces engaging said body portions along a plurality of points providing line contact, said packing element being disposed in the groove while substantially non-compressed, an annular thin-sectioned tapered rim extending outwardly from said body portion and out of the groove so as to engage the opposite face to form a seal between the cooperating members, said rim having a peripheral marginal portion thinner in section than any other portion thereof and being adapted for selectively allowing passage of a fluid in one direction parallel to said cylindrical faces, an annular depression in said packing element for increasing the yieldability of said rim and the ease of movement of said rim with respect to said body portion, said annular depression being positioned adjacent a point where said rim joins the packing element body portion.

References Cited in the file of this patent

UNITED STATES PATENTS

| | | |
|---|---|---|
| 2,196,337 | Loweke | Apr. 9, 1940 |
| 2,340,466 | Gosling | Feb. 1, 1944 |
| 2,450,693 | Sanders | Oct. 5, 1948 |
| 2,462,596 | Bent | Feb. 22, 1949 |
| 2,691,558 | Smith | Oct. 12, 1954 |

UNITED STATES PATENT OFFICE

CERTIFICATE OF CORRECTION

Patent No. 2,889,183                                June 2, 1959

Lucien Péras

It is hereby certified that error appears in the above numbered patent requiring correction and that the said Letters Patent should read as corrected below.

In the heading to the printed specification, between lines 5 and 6, insert -- Claims priority, application France April 26, 1955 --.

Signed and sealed this 17th day of November 1959.

(SEAL)
Attest:

KARL H. AXLINE
Attesting Officer

ROBERT C. WATSON
Commissioner of Patents